Oct. 1, 1946.  M. KADENACY  2,408,399
INTERNAL-COMBUSTION ENGINE
Filed Nov. 3, 1944  3 Sheets-Sheet 1
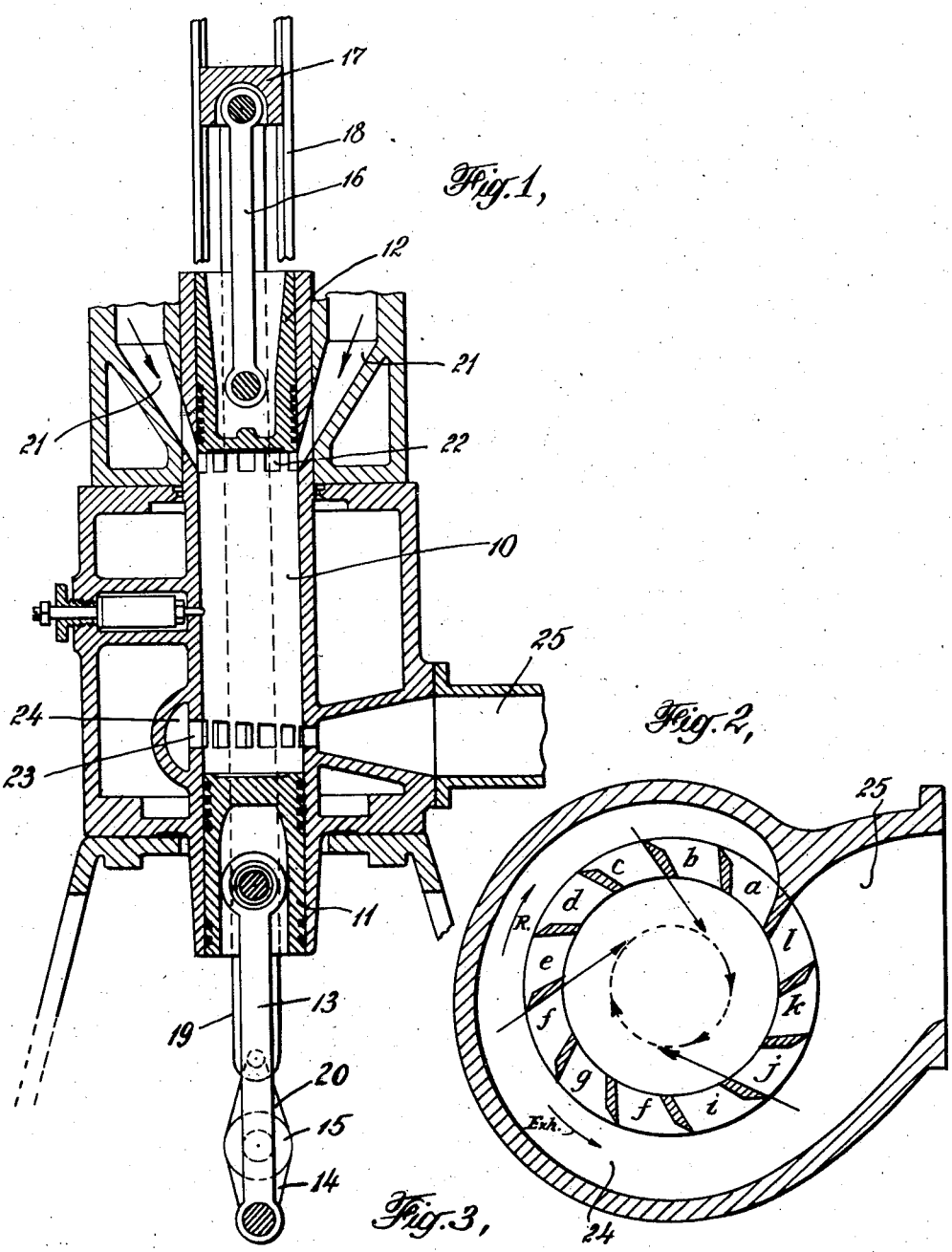
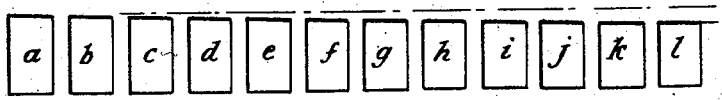
INVENTOR
Michel Kadenacy
BY
Pennie Davis Marvin Edmonds
ATTORNEYS

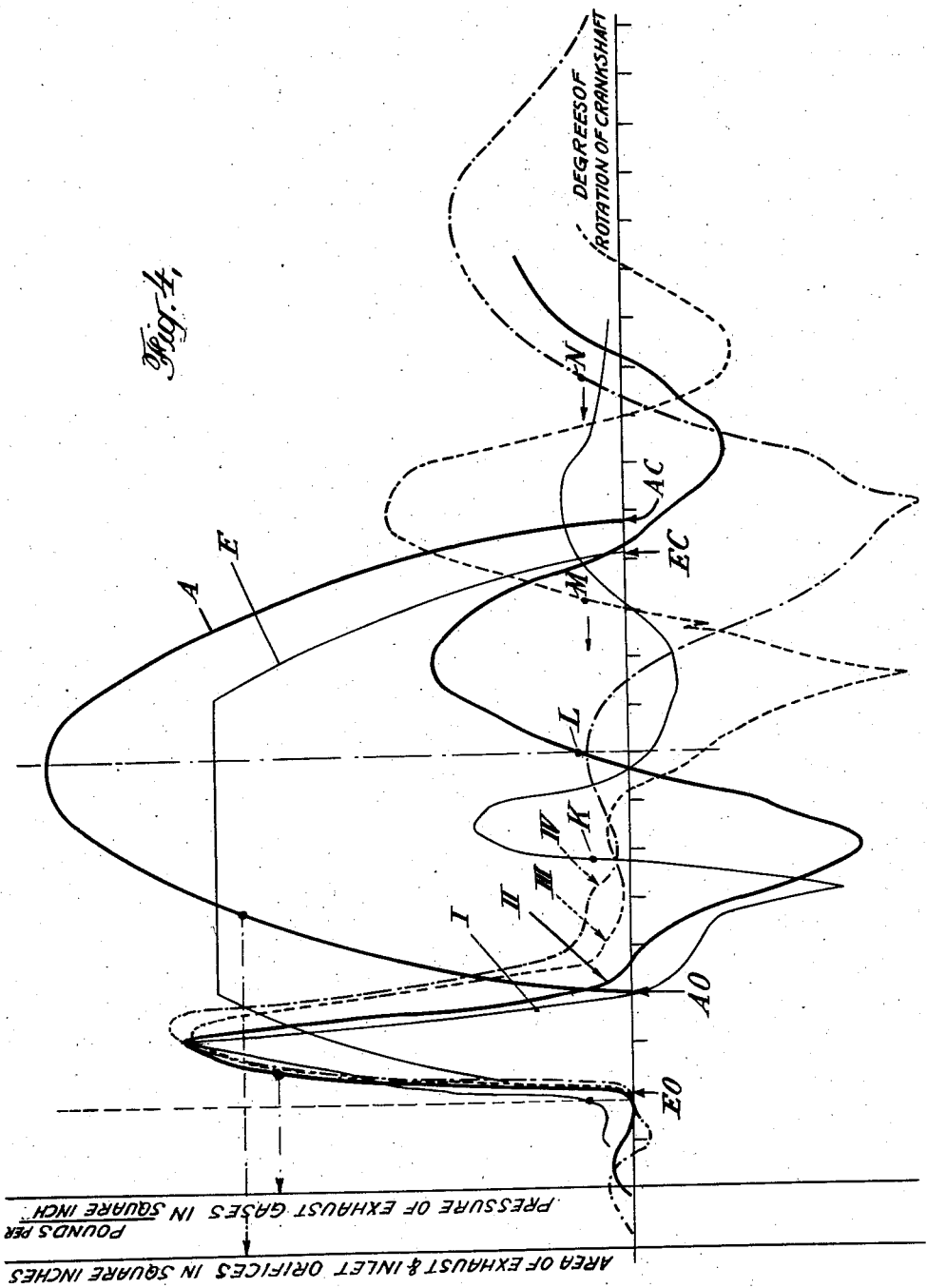

Oct. 1, 1946.  M. KADENACY  2,408,399
INTERNAL-COMBUSTION ENGINE
Filed Nov. 3, 1944   3 Sheets-Sheet 3
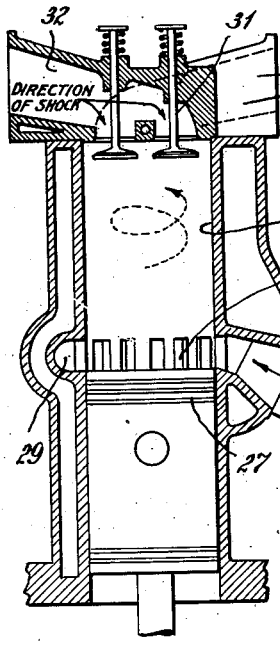
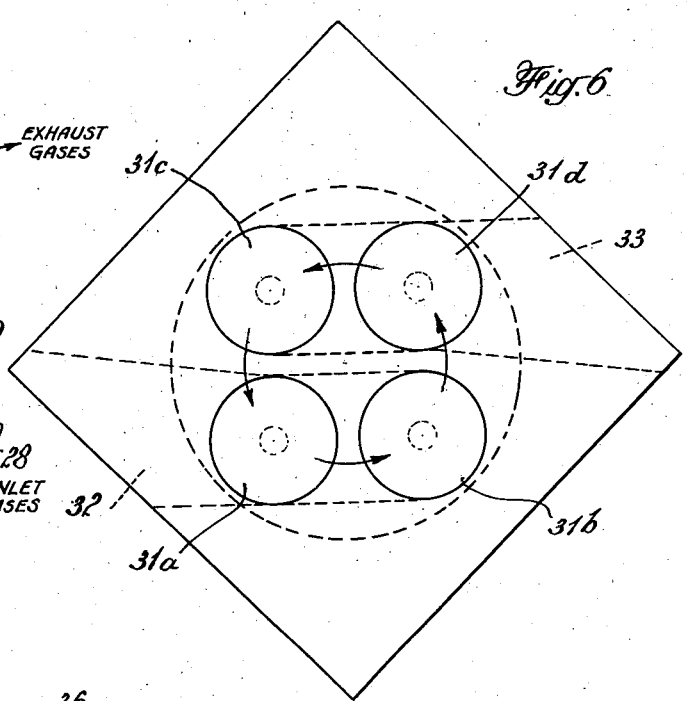
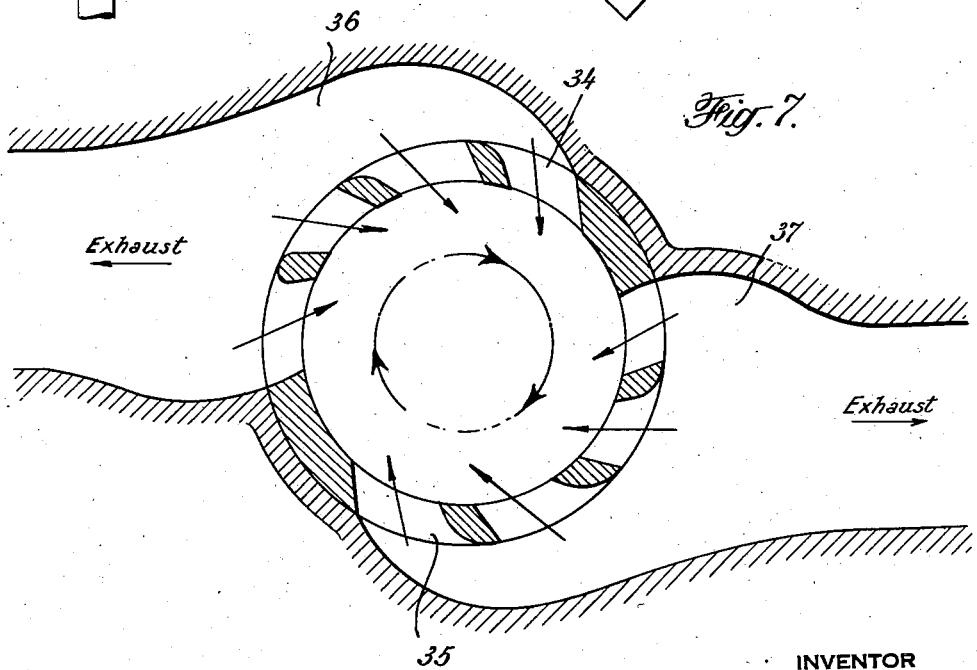
INVENTOR
Michel Kadenacy
BY
ATTORNEYS Patented Oct. 1, 1946

2,408,399

UNITED STATES PATENT OFFICE 2,408,399

INTERNAL-COMBUSTION ENGINE

Michel Kadenacy, Summit, N. J.

Application November 3, 1944, Serial No. 561,689

9 Claims. (Cl. 123—51)

This invention relates to internal combustion engines of the two-cycle type in which the fresh charge may enter the cylinder without directional control or may be so directed into the cylinder at the inlet that it travels through the cylinder with a swirling turbulent movement along a substantially helical path. More particularly, the invention is concerned with the provision in such an engine of novel means utilizing effects produced by the exhaust gases after they have left the cylinder for creating such a swirling movement of the charge, if none exists, or for maintaining or intensifying an existing swirling movement. In an engine equipped with the novel means referred to, the exhaust gases outside the cylinder and moving toward the latter are caused to impart energy to the gas within the cylinder in such manner as to obtain the desired result and the action of the new means improves the quality of combustion with a consequent improvement in engine performance.

As I have pointed out in various prior patents, as, for example, Patent 2,198,730, issued April 30, 1940, when the exhaust gases leave the cylinder of an internal combustion engine under such conditions that at least part of the gases issue as a body at a speed much higher than that obtaining in flow resulting from adiabatic expansion, the gases pass through a cycle of successive mass movements. Initially, the body of gases leaves the cylinder at high speed and a depression occurs within the cylinder and behind the body of gases in the exhaust pipe. The inlet gases then enter the cylinder and pass through it and out the exhaust port into the exhaust passage. The body of exhaust gases then undergoes its second movement, which is toward the cylinder and results in the formation of a shock front which precedes the center of the body. When this front reaches the inlet gases that have passed out of the cylinder, a shock is transmitted to the inlet gases, and, if the exhaust port is open at the time the shock front reaches the port, the shock will propagate through the gases in the cylinder. As a result, a movement of the gases in the cylinder will occur, the nature of the movement depending upon how the shock is transmitted to the gases.

It is well known to be desirable to introduce the inlet gases into the cylinder of a two-cycle engine in such manner that the gases travel within the cylinder with a generally rotational swirling movement, because of the better combustion obtained under such conditions, and the desired effect may be obtained by formation of the inlet ports to produce a directional effect. As the mass of a single charge of inlet gases is actually very small, the length of the time during which the rotational movement of the gases in such a charge will be maintained by inertia is correspondingly short. For that reason, the swirl of the gases produced by the action of the inlet means decreases in intensity quickly and the potential energy of the movement is quickly dissipated. Accordingly, if the shock transmitted to the gases within the cylinder through the exhaust orifices as a result of the return movement of the exhaust gases, is not directionally controlled, the application of the shock to the gases within the cylinder will be effective to destroy any swirling thereof, because of the great dynamic energy of the returning exhaust gases.

The present invention is directed to the provision in an internal combustion engine of the two-cycle type of exhaust means so constructed as to utilize the dynamic energy of the body of exhaust gases outside the cylinder and returning toward the cylinder to create a swirling movement of the fresh charge within the cylinder or to maintain or amplify an existing swirling movement. The new exhaust means may take the form of properly shaped ports opened by the piston or by sleeve action or of poppet valves, but, in each instance, the construction of the exhaust means is such that a shock may be transmitted by the returning exhaust gases to the charge within the cylinder in such manner that the desired result is obtained. The application of such shock for the purpose described is highly effective not only because of the large amount of dynamic energy contained in the returning exhaust gases, but also because of the timing of the transfer of the energy therefrom to the charge within the cylinder. Thus, in an ordinary engine in which the charge is introduced under directional control so that turbulence within the cylinder occurs, the turbulence begins at inlet opening and tends to die down before combustion as a result of the damping effect of friction and the action of the piston in the compression stroke. With the new exhaust means, the period between the time when the returning gases impart a shock to the gases within the cylinder and the combustion time is shorter than the time between inlet and combustion so that, in an engine equipped with the new exhaust means, the time within which the swirl in the charge resulting from the shock produced by the dynamic energy of the returning exhaust gases may be damped is reduced, and accordingly, at the instant of combustion, the intensity of the swirl is greater than would otherwise be the case.

For a better understanding of the invention, reference may be made to the accompanying drawings, in which Fig. 1 is a diagrammatic sectional view of an engine constructed in accordance with the invention;

Fig. 2 is a fragmentary horizontal sectional view through the exhaust ports of the engine shown in Fig. 1;

Fig. 3 is a schematic developed view of the exhaust ports of the engine to show the opening thereof;

Fig. 4 is a diagram showing pressures in the exhaust pipe near the port of an engine operating at different speeds and also showing the inlet and exhaust port areas;

Fig. 5 is a view similar to Fig. 1 of another type of engine embodying the invention;

Fig. 6 is a diagrammatic plan view of the engine of Fig. 5; and

Fig. 7 is a view similar to Fig. 2 of a modified construction.

The curves designated I, II, III, and IV of Fig. 4 are typical area timing diagrams of a two-cycle internal combustion engine and show the pressures in the exhaust pipe of such an engine at a point close to the exhaust orifice. In each instance, the opening of the exhaust, indicated by the point EO, precedes the opening of the inlet, indicated by the point AO, by a period, which in practice varies between 15°–25° of crank travel. Also, the exhaust closing, indicated by EC, occurs before the inlet closing, indicated by AC. The points K, L, M, and N on the curves I, II, III, and IV, respectively, indicate the instants when the exhaust gases in their return movement through the exhaust pipe have reached the exhaust port and the positions of these points in terms of crankshaft travel depend upon the speed of the engine and the formation of the exhaust pipe. Assuming that the exhaust pipe construction is the same in each case, curve I represents a low engine speed with the crankshaft traveling through a relatively small angle before the gases return to the exhaust port, and the other curves represent successively higher speeds. Curve E shows the magnitude of the area of the opening of the exhaust ports relative to the angular position of the crankshaft and curve A shows the magnitude of the area of the opening of the inlet ports relative to the angular position of the crankshaft. From these curves, it will be seen that in the cases represented by curves I and II, the shock produced by the returning gas will have free access to the interior of the cylinder, since the points K and L occur while the exhaust port is fully open. In the case represented by curve III, the shock will arrive at the exhaust port, as indicated by the point M, while the port is closing, so that the shock may not have its greatest effect on the gases within the cylinder. In the case shown by curve IV, the exhaust port is closed before the shock reaches it, as indicated at N.

It will be understood that, in an engine constructed in accordance with the disclosure of my Patent 2,144,065, issued January 17, 1939, to take advantage of the effect of discharging the exhaust gases as a mass at extremely high speed, the depression left within the cylinder by such discharge may be utilized to introduce the fresh charge. If the conditions are correct, the incoming gases will travel through the cylinder and pass out the exhaust port into the exhaust pipe, this movement continuing until the exhaust gases farther along the pipe reach the end of their outward movement and begin to return toward the cylinder. In their return, the exhaust gases transmit a shock to the fresh gases which are in movement within the exhaust pipe close to the exhaust port and the shock is transmitted through the fresh gases and passes through the exhaust ports. The shock is so directed in accordance with the present invention, that it serves to create a swirl in the gases within the cylinder, if no such swirl exists, or to maintain or intensify any existing swirl.

The construction of the exhaust means for producing the desired effect may vary considerably and the engine shown in Fig. 1 embodies one suitable construction. The engine includes a cylinder 10 in which operate opposed pistons 11, 12. Piston 11 is connected directly by rod 13 to the crank arm 14 of a crankshaft 15. Piston 12 is connected by a rod 16 to a cross head 17 mounted in guides 18 and connected by a rod 19 with a crank arm 20 on the crankshaft, which is in opposed relation to crank arm 14.

Admission takes place through conduits 21 in the cylinder wall leading to ports 22, and the burnt gases are discharged through exhaust ports 23 which open into a chamber 24 extending around the cylinder and connected at one end to an exhaust pipe 25. The opening of both sets of ports is controlled by the pistons, and the inlet ports may be arranged tangentially so that the incoming gases will swirl downwardly through the cylinder with a rotational movement that is clockwise when viewed from above. The exhaust ports are similarly arranged so that, upon the return movement of the exhaust gases through the exhaust pipe, the shock transmitted thereby to such of the inlet gases as have passed through the cylinder into the pipe, passes through the exhaust ports and is thereby directed so as to impart to the gases within the cylinder a swirling movement in the same sense as that of the gases entering through the inlet ports. As a result, the shock maintains the swirl existing within the cylinder, and, under proper conditions, will intensify that swirl, because of the great dynamic energy in the returning exhaust gases transmitted in the form of the shock.

When a single exhaust pipe is used, as shown in Fig. 2, and the exhaust ports are disposed entirely around the cylinder, it is advisable to place the ports so that the first port $a$ at the end of chamber 24 remote from the exhaust pipe, will begin to open between 2° and 5° of crank angle before the last port $l$ of the series, the actual lead of the first port depending on the speed of the engine. The arrangement described is illustrated in Fig. 3, in which it will be seen that the upper ends of the ports from $a$ to $l$, inclusive, are successively lower, so that the piston starts to open port $a$ ahead of port $b$ and so on throughout the series. By thus opening port $a$ first, the gases at rest within chamber 24 will start to move through the chamber with the opening of the port, and the movement through the chamber toward the exhaust pipe will have been established by the time that port $l$ begins to open. When the exhaust gases are in return movement through the exhaust pipe, the shock transmitted to the inlet gases within chamber 24 will cause a reverse movement of those gases and some of the inlet gases which have previously issued from the ports will return therethrough and enter the cylinder tangentially. The shock and the return movement of the inlet gases will assist in effecting rotational movement of the gases in the cylinder.

The engine illustrated in Fig. 5 includes cylinder 26 in which operates a piston 27. Inlet gases are admitted to pipe 28 leading to chamber 29 from which ports 30 lead to the interior of the cylinder. The exhaust of the gases is controlled by poppet valves 31 in the cylinder head. Four such valves may be provided, and gases issuing through valves 31a and 31b escape through a chamber 32, while gases issuing through valves 31c and 31d escape through a chamber 33. With the arrangement shown, the shock transmitted to the gases in the chambers 32, 33 by the exhaust gases moving back toward the cylinder will be so directed by the arrangement of the exhaust valves as to impart to the gases within the cylinder a rotational movement counterclockwise when viewed from above. The inlet ports in such an engine are, preferably, tangentially arranged so as to cause the incoming inlet gases to swirl in the same direction.

In some engines, it may be desirable to provide two exhaust pipes, and in that case, the arrangement may be as shown in Fig. 7. The exhaust ports shown in that figure are arranged in two groups, designated 34 and 35, and ports 34 lead to a chamber 36 connected to an exhaust pipe, while ports 35 lead to a similar chamber 37 connected to another exhaust pipe. The ports are arranged tangentially and in such relation to the inlet ports that the shock passing through the exhaust ports will maintain the swirl imparted to the incoming gases by the inlet ports.

In the engines above described, the exhaust port closes before the inlet port, while in other engines, the exhaust remains open longer than the inlet. In engines of the second type, the effect of the shock produced by the exhaust gases in their return movement toward the cylinder is greater than in engines of the first type. In engines of the second type, therefore, it is much more important to prevent the shock from impairing or destroying the swirl of the inlet gases and, with the new exhaust means, the effective range of speed of such engines is increased.

In the preferred application of the invention, the engine will include inlet ports which exercise a directional control over the inlet gases so that they will travel through the cylinder with a swirling movement. The exhaust ports of the engine will then be so arranged that the shock transmitted to the inlet gases in the cylinder by the exhaust gases in their return movement toward the cylinder will be so directed as to maintain or intensify the swirl within the cylinder. However, if the inlet ports are not so constructed as to produce a swirl in the fresh charge within the cylinder, the provision in the engine of the new exhaust means produces a useful effect in that the shock produced by the returning exhaust gases will set up a swirl in the charge and combustion will thereby be improved.

I claim:

1. In an internal combustion engine of the two-cycle type having a cylinder and inlet means for admitting fresh gases into the cylinder, exhaust means for the escape of exhaust gases constructed and operated to direct the shock, imparted to the fresh gases within the cylinder by exhaust gases outside the cylinder in their return movement toward the cylinder, to cause the shock to produce a generally rotational movement of the fresh gases.

2. In an internal combustion engine of the two-cycle type having a cylinder and inlet means for admitting fresh gases into the cylinder, exhaust ports for the escape of exhaust gases constructed and operated to direct the shock, imparted to the fresh gases within the cylinder by exhaust gases outside the cylinder in their return movement toward the cylinder, to cause the shock to produce a generally rotational movement of the fresh gases.

3. In an internal combustion engine of the two-cycle type having a cylinder, the combination of inlet means for admitting fresh gases into the cylinder and operating to cause the gases to travel within the cylinder with a rotational movement, and exhaust means for the escape of exhaust gases constructed and operated to direct the shock, imparted to the fresh gases within the cylinder by exhaust gases outside the cylinder in their return movement toward the cylinder, to produce a rotational movement of the fresh gases which is the same in sense as that produced by the inlet means.

4. In an internal combustion engine of the two-cycle type having a cylinder, the combination of inlet means for admitting fresh gases into the cylinder and operating to cause the gases to travel through the cylinder with a rotational movement, and exhaust ports for the escape of exhaust gases so constructed and operated to direct the shock, imparted to the fresh gases within the cylinder by exhaust gases outside the cylinder in their backward movement toward the cylinder, to produce a rotational movement of the fresh gases which is the same in sense as that produced by the inlet means.

5. In an internal combustion engine of the two-cycle type having a cylinder, the combination of inlet means and exhaust means for the cylinder, each of said means including a group of ports through the cylinder wall, the ports of both groups having tangential arrangements in the same sense with reference to the cylinder, and said exhaust means operating to insure that a swirling movement will be imparted to the fresh charge within the cylinder by the shock transmitted to the charge by exhaust gases outside the cylinder in their return movement toward the cylinder, said swirling movement being in the same direction as that imparted to the charge as it enters the cylinder through the inlet ports.

6. In an internal combustion engine of the two-cycle type having a cylinder, the combination of inlet means admitting gases into the cylinder, exhaust means including ports in the cylinder wall, a chamber extending around the cylinder and in communication with the ports, and an exhaust pipe leading from the chamber, the exhaust means being so constructed and operated as to direct the shock transmitted to the gases within the cylinder by exhaust gases outside the cylinder in their backward movement toward the cylinder, to cause a rotational movement of the gases within the cylinder.

7. In an internal combustion engine of the two-cycle type having a cylinder and a piston, the combination of inlet means admitting gases into the cylinder, exhaust means including ports in the cylinder wall arranged in a circumferential series, a chamber encircling the cylinder at the ports and in communication with the ports, and an exhaust pipe leading from one end of the chamber, the exhaust ports being formed to direct the shock transmitted to the gases within the cylinder by exhaust gases outside the cylinder in their backward movement toward the cylinder to cause a rotational movement of the gases within the cylinder, and the ports being arranged to be opened successively by the piston, beginning with the port farthest along the chamber from the exhaust pipe.

8. In an internal combustion engine of the two-cycle type having a cylinder, the combination of inlet means admitting gases into the cylinder, exhaust means including ports in the cylinder wall, a pair of chambers each extending part way around the cylinder and in communication with part of the ports, and an exhaust pipe leading from each chamber, the exhaust means being so constructed and operated as to direct the shock transmitted to gases within the cylinder by exhaust gases outside the cylinder in their backward movement toward the cylinder, to cause a rotational movement of the gases within the cylinder.

9. In an internal combustion engine of the two-cycle type having a cylinder, the combination of inlet means for admitting gases into the cylinder, a plurality of exhaust valves arranged into two groups, and separate exhaust pipes for each group of valves, the valves of the groups being arranged and operated as to direct the shock transmitted to gases within the cylinder by exhaust gases outside the cylinder in their return movement toward the cylinder, to cause a rotational movement of the gases within the cylinder.

MICHEL KADENACY.